United States Patent Office 3,746,769
Patented July 17, 1973

3,746,769
ETHER COMPOUNDS AS INHALATION ANESTHETICS
Ross C. Terrell, Plainfield, N.J., assignor to Airco, Inc.
No Drawing. Filed Aug. 23, 1971, Ser. No. 174,248
Int. Cl. A61k 27/00
U.S. Cl. 424—342      8 Claims

ABSTRACT OF THE DISCLOSURE

Aliphatic ether compounds of the formula $$CHF_2-CH_2-O-CF_2-CHX_2$$

wherein each X is F or Cl, are useful as inhalation anesthetics.

---

This invention relates to certain aliphatic ether compounds and their use in producing anesthesia in anesthetic-susceptible mammals.

The compounds of the present invention have the formula $$CHF_2-CH_2-O-CF_2-CHX_2$$

wherein each X is F or Cl. These compounds lend themselves to effective use as inhalant anesthetics in respirable mixtures containing life-supporting concentrations of oxygen, with or without other inhalation anesthetics, such as nitrous oxide. Administration of the compounds may be by any of the well known techniques for administering general inhalation anesthetics, for example by using the open drip, semi-closed or closed systems.

The effective amounts of the compounds of this invention to be employed depend on the level of anesthesia to which the mammal is to be brought, the rate at which anesthesia is to be induced, and the length of time over which anesthesia is to be maintained. Minor volume percentages of the compound in oxygen can often be employed. The amount used should be sufficient to provide a significant anesthetic effect, but not so much as to produce unacceptable deleterious side effects. Vapor concentrations at which the compounds of this invention may often be used are about 1 to 4 volume percent, with the concentration actually employed depending on the choice of anesthetic; for instance, 2-chloro-1,1,2-trifluoroethyl 2',2'-difluoroethyl ether may often be used in an amount of about 1 to 3%, 2,2-dichloro-1,1-difluoroethyl 2',2'-difluoroethyl ether may often be used in an amount of about 1 to 4%, and 1,1,2,2-tetrafluoroethyl 2',2'-difluoroethyl ether may often be used in an amount of about 2 to 4%. The amount of anesthesia to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

The ether compounds of this invention are also easily miscible with other organic liquids, including fats and oils, and have useful solvent properties, for example as solvents for fluorinated olefins and other fluorinated materials, such as fluoro waxes. The compounds of this invention may be used to prepare pastes and dispersions of such materials useful for coatings and the like, and may be used as degreasing agents. In the latter capacity, for example, the ether compounds of this invention can be used as solvents to remove grease or other oily substances from metal surfaces that are to be painted.

The following examples illustrate the preparation of the compounds of this invention.

EXAMPLE I

This example illustrates the preparation of 2,2-difluoroethyl 2'-chloro-1',1',2'-trifluoroethyl ether.

Potassium hydroxide (6 g., 0.095 mole) was added to a solution of commercially obtained 2,2-difluoroethanol (i.e., $CHF_2CH_2OH$) (24.6 g., 0.3 mole) in dimethylsulfoxide to give a yellow solution. Commercially obtained, gaseous chloroperfluoroethene (i.e., $CF_2=CFCl$) was then bubbled into the reaction mixture while maintaining the temperature at 50–60° C. When no more $CF_2=CFCl$ reacted, the reaction mixture was washed with water and the organic product distilled to give $$CHF_2CH_2OCF_2CHFCl.$$

Calculated for $C_4H_4ClF_5O$ (percent): C, 24.18; H, 2.02. Found (percent): C, 24.25; H, 1.98.

This normally liquid material has a boiling point of 102° C. and a refractive index ($n_D^{20}$) of 1.3351.

EXAMPLE II

This example illustrates the preparation of 2,2-difluoroethyl 1',1'-difluoro-2',2'-dichloroethyl ether.

The synthesis of $CHF_2CH_2OCF_2CHCl_2$ was performed in the same manner as in Example I, except that commercially obtained 1,1-dichloro-2,2-difluoroethene (i.e., $CF_2=CCl_2$) was used instead of $CF_2=CFCl$.

Calculated for $C_4H_4Cl_2F_4O$ (percent): C, 22.33; H, 1.86. Found (percent): C, 22.60; H, 1.66.

This normally liquid material has a boiling point of 132° C. and a refractive index ($n_D^{20}$) of 1.3721.

EXAMPLE III

This example illustrates the preparation of 2,2-difluoroethyl 2'-hydroperfluoroethyl ether.

The synthesis of $CHF_2CH_2OCF_2CF_2H$ was performed in the same manner as in Example I, except that commercially obtained perfluoroethane (i.e. $CF_2=CF_2$) was used instead of $CF_2=CFCl$ and the reaction was conducted in a 500 cc. stirred autoclave at a pressure of 50–200 p.s.i.

Calculated for $C_4H_4F_6O$ (percent): C, 26.37; H, 2.20. Found (percent): C, 26.42; H, 2.09.

This normally liquid material has a boiling point of 77.5° C. and a refractive index ($n_D^{20}$) of 1.2913.

In order to determine the potency of the aliphatic ethers of the present invention as inhalation anesthetics in combination with oxygen, tests were carried out on mice. The compounds tested were at least 99.5% pure as determined by vapor phase chromatography. In the tests, the ether compound is administered to test mice by a standard procedure in which a measured quantity of the agent is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk.

In such tests the 2-chloro-1,1,2-trifluoroethyl 2',2'-difluoroethyl ether induced anesthesia in the mice in 1 minute, 10 seconds when used at a vapor concentration of 1.5 volume percent. Induction was smooth, but there was twitching throughout maintenance of the anesthesia. Recovery required 3 minutes, 40 seconds. When used at 2.5% vapor concentration, essentially the same results were observed, except that the induction period was shortened to 50 seconds and the recovery period was lengthened to 5 minutes, 58 seconds. One mouse out of five was briefly cyanotic in the recovery period. At 3.5% concentration, the anesthesia was accompanied by undesirable side effects, including respiratory depression to a rate of about 80 per minute.

Use of 1.0% vapor concentration of the 2,2-dichloro-1,1-difluoroethyl 2',2'-difluoroethyl ether resulted in induction of anesthesia in 2 minutes, 15 seconds. The anesthesia was very light and the mice moved while under it. Recovery required 1 minute, 22 seconds.

The 1,1,2,2-tetrafluoroethyl 2′,2′-difluoroethyl ether, when used at 2.5% vapor concentration, barely induced anesthesia in 1 minute, 37 seconds. Recovery therefrom required 2 minutes and was accompanied by hyperexcitability. At 3.5% vapor concentration, the induction time was 1 minute, 20 seconds and the recovery time was 1 minute, 10 seconds. There was quivering during induction and, once again, hyperexcitability in recovery. At 5.0 volume percent vapor concentration, the anesthesia was accompanied by undesirable side effects, including the deaths of 2 out of 5 mice treated.

While there have been described what are at present considered to be preferred embodiments of the invention, it will be understood that various modifications may be made therein which are within the true spirit and scope of the invention.

It is claimed:

1. An inhalant aneshthetic composition comprising an aliphatic ether compound of the formula $$CHF_2\text{---}CH_2\text{---}O\text{---}CF_2\text{---}CHX_2$$

wherein each X is F or Cl, and oxygen in suitable proportions for use as an anesthetic.

2. The composition of claim 1 wherein the compound has the formula $$CHF_2\text{---}CH_2\text{---}O\text{---}CF_2\text{---}CHF_2$$

3. The composition of claim 1 wherein the compound has the formula $$CHF_2\text{---}CH_2\text{---}O\text{---}CF_2\text{---}CHFCl$$

4. The composition of claim 1 wherein the compound has the formula $$CHF_2\text{---}CH_2\text{---}O\text{---}CF_2\text{---}CHCl_2$$

5. A method of anesthetizing an anesthetic-susceptible mammal which comprises administering to the mammal an anesthetically-effective amount of an aliphatic ether compound of the formula $$CHF_2\text{---}CH_2\text{---}O\text{---}CF_2\text{---}CHX_2$$

wherein each X is F or Cl, as an inhalation anesthetic, while administering life-supporting amounts of oxygen.

6. The method of claim 5 wherein the compound has the formula $$CHF_2\text{---}CH_2\text{---}O\text{---}CF_2\text{---}CHF_2$$

7. The method of claim 5 wherein the compound has the formula $$CHF_2\text{---}CH_2\text{---}O\text{---}CF_2\text{---}CHFCl$$

8. The method of claim 5 wherein the compound has the formula $$CHF_2\text{---}CH_2\text{---}O\text{---}CF_2\text{---}CHCl_2$$

References Cited

UNITED STATES PATENTS

| | | | |
|---|---|---|---|
| 3,483,298 | 12/1969 | Krantz et al. | 424—342 |
| 3,557,294 | 1/1971 | Dear et al. | 424—342 |

OTHER REFERENCES

Merck Index, 8th edition, 1968, Merck & Co., Inc., p. 467.

JEROME D. GOLDBERG, Primary Examiner

U.S. Cl. X.R.

260—614 F